US012207642B2

United States Patent
Varner et al.

(10) Patent No.: US 12,207,642 B2
(45) Date of Patent: Jan. 28, 2025

(54) ATTRACTANTS FOR MICE

(71) Applicants: Elana Varner, North Vancouver (CA); Gerhard J. Gries, Coquitlam (CA); Regine M. Gries, Coquitlam (CA); Stephen J. Takacs, Hope (CA)

(72) Inventors: Elana Varner, North Vancouver (CA); Gerhard J. Gries, Coquitlam (CA); Regine M. Gries, Coquitlam (CA); Stephen J. Takacs, Hope (CA)

(73) Assignee: OMS Investments, Inc., Los Angeles, CA (US)

( * ) Notice: Subject to any disclaimer, the term of this patent is extended or adjusted under 35 U.S.C. 154(b) by 998 days.

(21) Appl. No.: 16/401,673

(22) Filed: May 2, 2019

(65) Prior Publication Data
US 2019/0335740 A1    Nov. 7, 2019

Related U.S. Application Data

(60) Provisional application No. 62/667,376, filed on May 4, 2018.

(51) Int. Cl.
| | | |
|---|---|---|
| *A01M 25/00* | (2006.01) | |
| *A01N 31/02* | (2006.01) | |
| *A01N 45/02* | (2006.01) | |

(52) U.S. Cl.
CPC ........... *A01M 25/004* (2013.01); *A01N 31/02* (2013.01); *A01N 45/02* (2013.01); *A01M 2200/00* (2013.01)

(58) Field of Classification Search
CPC .. A61K 31/683; A61K 31/662; A61K 31/665; A61K 31/19; A61K 31/663; A61K 45/06; A61K 9/0019; A61K 31/664; A61K 31/675; A61P 19/04; A61P 1/16; A61P 43/00
See application file for complete search history.

(56) References Cited

U.S. PATENT DOCUMENTS

| | | | | |
|---|---|---|---|---|
| 2,205,627 A | * | 6/1940 | Scholz | ............... C07J 75/00 |
| | | | | 552/625 |
| 3,496,272 A | | 2/1970 | Kruger Gunther | |
| 4,021,568 A | | 5/1977 | Suttie | |
| 4,105,992 A | | 8/1978 | Luciano | |
| 4,376,112 A | | 3/1983 | Miller | |

(Continued)

FOREIGN PATENT DOCUMENTS

| | | |
|---|---|---|
| CA | 356218 A | 3/1936 |
| CN | 1500387 A | 6/2004 |

(Continued)

OTHER PUBLICATIONS

E. B. Razote, R. G. Maghirang, L. M. Seitz, I. J. Jeon, Characterization of Volatile Organic Compounds On Airborne Dust in a Swine Finishing Barn, Transactions of the ASAE. 47(4): 1231-1238. (doi: 10.13031/2013.16573) @ 2004 (Year: 2004).*

(Continued)

*Primary Examiner* — Jeffrey S Lundgren
*Assistant Examiner* — Anthony Seitz

(57) ABSTRACT

Compositions attractive to mice include one or more long-range volatiles and one or more short-range volatiles. The long-range volatiles can include butyric acid, 2-methylbutyric acid, and 4-heptanone. Devices and methods of using the compositions are also disclosed.

14 Claims, 8 Drawing Sheets

(56) References Cited

U.S. PATENT DOCUMENTS

| | | |
|---|---|---|
| 4,603,504 A | 8/1986 | Llanos |
| 5,672,628 A | 9/1997 | Heiskanen et al. |
| 6,272,791 B1 | 8/2001 | Pleasants |
| 2005/0181003 A1 | 8/2005 | Endepols et al. |
| 2006/0263488 A1 | 11/2006 | Pupko et al. |
| 2008/0216387 A1 | 9/2008 | Peters |
| 2008/0260683 A1 | 10/2008 | Bowman et al. |
| 2010/0158892 A1 | 6/2010 | Cayley et al. |
| 2011/0041383 A1 | 2/2011 | Cink et al. |
| 2011/0268692 A1 | 11/2011 | Endepols |
| 2015/0128479 A1 | 5/2015 | Takacs et al. |

FOREIGN PATENT DOCUMENTS

| | | | |
|---|---|---|---|
| CN | 201967568 U | 9/2011 | |
| DE | 29709474 U1 * | 9/1997 | ............ A01M 31/06 |
| DE | 29709475 U1 | 11/1997 | |
| DE | 29809474 U1 | 9/1998 | |
| DE | 10326833 A1 | 2/2005 | |
| EP | 1279334 A1 | 1/2003 | |
| EP | 1279334 B1 | 8/2004 | |
| FR | 2641943 A1 | 7/1990 | |
| JP | 2005120048 A | 5/2005 | |
| SU | 1724148 A1 | 4/1992 | |
| WO | 9307749 A1 | 4/1993 | |
| WO | 2010106352 A2 | 9/2010 | |
| WO | 2010106352 A3 | 3/2011 | |
| WO | 2013003946 A1 | 1/2013 | |
| WO | 2014186885 A1 | 11/2014 | |
| WO | 2017096485 A1 | 6/2017 | |
| WO | WO-2017201614 A1 * | 11/2017 | ............ A01M 25/00 |

OTHER PUBLICATIONS

Marsh, R. E. et al., "Chemosterilants as an approach to rodent control," Proceedings of the 4th Vertebrate Pest Conference, 14, Mar. 31, 1970, pp. 55-63 (10 pages).

Jemiolo, B. et al., "Behavioural and Endocrine Response of Female Mice to Synthetic Analogues of Volatile Compounds in Male Urine". Animal Behavior, Nov. 1985 (Nov. 1985), vol. 33(4), pp. 1114-1118.

Jemiolo, B. et al., "Promotion of the Whitten Effect in Female Mice by Synthetic Analogs of Male Urinary Constituents". Proceedings from the National Academy of Sciences, Jun. 1986 (Jun. 1986), vol. 83, pp. 4576-4579.

Harvey, S. et al., "Pattern of Volatile Compounds in Dominant and Subordinate Male Mouse Urine". Journal of Chemical Ecology, Jul. 1989 (Jul. 1989), vol. 15(7), pp. 2061-2072.

Ninomiya, K. et al., "Female-attracting Property of Urinary Compounds in Male Mice". The Science of Nature, Dec. 1990 (Dec. 1990), vol. 77(12), pp. 586-588.

Bacchini, A. et al., "Pheromone Binding Proteins of the Mouse, Mus musculus". Experientia, Apr. 15, 1992 (Apr. 15, 1992), vol. 48(4), pp. 419-421.

Drickamer, L.C. et al., "Use of Odor Baits in Traps to Test Reactions to Intra-and Interspecific Chemical Cues in House Mice Living in Outdoor Enclosures". Journal of Chemical Ecology, Dec. 1992 (Dec. 1992), vol. 18(12), pp. 2223-2250.

Potter et al., "Separation of Estrogens and Rodenticides Using Capillary Electrophoresis with Aqueous-Methanolic Buffers," Journal of Chromatography A, 1993, vol. 652, pp. 427-429 (3 pages).

Drickamer, L.C. et al., "Odors in Traps: Does Most Recent Occupant Influence Capture Rates for House Mice". Journal of Chemical Ecology, May 1995 (May 1995), vol. 21(5), pp. 541-555.

Mossman, C.A. et al., "Odor Preferences of Female House Mice (Mus domesticus) in Seminatural Enclosures". Journal of Comparative Psychology, Jan. 1996 (Jan. 1996), vol. 110(2), pp. 131-138.

Haim, et al., "Serum levels of sex hormones and corticosterone throughout 4- and 5-day estrous cycles in Fischer 344 rats and their simulation in ovariectomized females," J Endocrinol Invest., Oct. 2003; vol. 26(10), pp. 1013-1022.

Burger, B.V., "Mammalian Semiochemicals," Topics in Current Chemistry, 2005, vol. 240, pp. 231-278 (48 pages).

Jacob et al., "Fertility Control of Rodent Pests," Wildlife Research, 2008, vol. 35, pp. 487-493 (7 pages).

Osada, K. et al., "The Identification of Attractive Volatiles in Aged Male Mouse Urine". Chemical Senses, Jul. 24, 2008 (Jul. 24, 2008), vol. 33, pp. 815-823.

Zhang et al., "Sex- and Gonad-Affecting Scent Compounds and 3 Male Pheromones in the Rat", Chemical Senses, vol. 33, p. 611-621). (2008.

Bernstein, "Rodent Control: Weighing Your Mouse Trap Options", an internet article obtained from https://bhnnyapt.apartmentratings.com/rodent-control-weighing-your-mouse-trap-options.html, 2009.

"Rats and Mice: What's the Difference," ratbehaviororg, 2010. Web May 4, 2016. http://web_archive.org/web/20100525165650/http://www.ratbehaviororg/RatsMice.htm.

Archunan et al., "Preputial Gland: A Potent Pheromone Source in Rodents, Chapter XIII," The Biology of Odors, 2011, vol. 1, pp. 321-339, ISBN 978-1-61122-952-3 (10 pages).

http://web.archive.org/web/20120118025825/http://www.alaskaproteinrecovery.com/Salmonoil; Website Titled "Alaska Protein Recovery" ; accessed Aug. 4, 2016; web archive version dated Jan. 18, 2013 downloaded; 2-pg pdf.

Quay et al., "Rat Pheromone Site," Texas Tech University, https://www.depts_ttu_edu/animalwelfare/Research/Pheromones/Rat.php, Publication date Aug. 18, 2016, Retrieved from the Internet on Mar. 20, 2019 (3 pages).

Takacs et al., "The Sex Attractant Pheromone of Male Brown Rats: Identification and Field Experiment," Angewandte Chemie International Edition, English, May 10, 2016, vol. 55, pp. 6062-6066 (5 pages).

Musso, A.E. et al., "Effect of Male House Mouse Pheromone Components on Behavioral Responses of Mice in Laboratory and Field Experiments". Journal of Chemical Ecology, Jan. 27, 2017 (Jan. 27, 2017), vol. 43(3), pp. 215-224.

Takacs, S., et al., "New food baits for trapping house mice, black rats and brown rats," Applied Animal Behavior Science, Dec. 2, 2017 (Dec. 2, 2017), vol. 200 (2018), pp. 130-135.

Takacs, S., et al., "Sex Hormones Function as Sex Attractant Pheromones in House Mice and Brown Rats". Chembiochem Communications, Jun. 8, 2017 (Jun. 8, 2017), vol. 18, pp. 1391-1395.

Varner, E., et al., "Identification and Field Testing of Volatile Components in the Sex Attractant Pheromone Blend of Female House Mouse," Journal of Chemical Ecology, Nov. 9, 2018 (Nov. 2, 2018), vol. 45, pp. 18-27.

Musso, A.E., "Contributions to the Development of Effective Food Baits and Pheromone Lures for Capturing Mice and Rats". Thesis from Simon Fraser University, British Columbia, Canada, Apr. 21, 2016 (Apr. 21, 2016), pp. 1-76, [online] [retrieved on Jun. 20, 2017 (Jun. 20, 2017)]. Retrieved from the Internet: http://summit.sfu.ca/item/16339.

* cited by examiner

ATTRACTANTS FOR MICE

TECHNICAL FIELD

The present disclosure generally relates to compositions, devices, and methods for attracting mice.

BACKGROUND

Mice are global pests. They cause damage by soiling food, spreading allergens, diminishing yields of agricultural crops, serving as reservoirs for disease-causing pathogens, endangering island seabird colonies, and by acting as an invasive species harming indigenous fauna (Wanless et al. 2007, Angel et al. 2009). These many adverse effects have prompted ongoing efforts to trap and poison mice. However, mice can exhibit neophobia (the fear of new objects) (Brigham & Sibley 1999). The lag time for neophobic rodents to become conditioned to the presence of newly placed traps, or trap boxes containing snap traps, and to enter them greatly reduces the effectiveness of mouse control efforts.

SUMMARY

According to one embodiment, a composition for attracting a mouse includes one or more long-range volatiles and one or more short-range volatiles. The one or more long-range volatiles include butyric acid, 2-methylbutyric acid, 4-heptanone, and 3-methylbutyric acid. The one or more long-range volatiles are isolated, synthetic, or purified.

According to another embodiment, a composition for attracting a mouse includes one or more long-range volatiles. The one or more long-range volatiles include butyric acid, 2-methylbutyric acid, 4-heptanone, and 3-methylbutyric acid. The one or more long-range volatiles are isolated, synthetic, or purified.

According to another embodiment, a method of attracting a mouse includes providing a composition including one or more long-range volatiles and one or more short-range volatiles. The one or more long-range volatiles include butyric acid, 2-methylbutyric acid, 4-heptanone, and 3-methylbutyric acid. The one or more long-range volatiles are isolated, synthetic, or purified.

According to another embodiment, a device for attracting a mouse includes a housing or a trap and a composition including one or more long-range volatiles and one or more short-range volatiles. The one or more long-range volatiles include butyric acid, 2-methylbutyric acid, 4-heptanone, and 3-methylbutyric acid. The one or more long-range volatiles are isolated, synthetic, or purified. The composition is adjacent to, or included within, the housing or the trap.

According to another embodiment, a device for attracting a mouse includes a housing for receiving a mouse and a composition including one or more long-range volatiles and one or more short-range volatiles. The one or more long-range volatiles include butyric acid, 2-methylbutyric acid, 4-heptanone, and 3-methylbutyric acid. The one or more long-range volatiles are isolated, synthetic, or purified. The composition is adjacent to, or included within, the housing.

According to one embodiment, a composition for attracting a mouse includes one or more long-range volatiles and one or more short-range volatiles. The one or more long-range volatiles include butyric acid, 2-methylbutyric acid, 4-heptanone, and 3-methylbutyric acid. The composition attracts at least 3 times more male mice than a composition including the one or more short-range volatiles that is substantially free of the one or more long-range volatiles.

According to another embodiment, a method of attracting a mouse includes providing a composition including one or more long-range volatiles and one or more short-range volatiles. The one or more long-range volatiles include butyric acid, 2-methylbutyric acid, 4-heptanone, and 3-methylbutyric acid. The composition attracts at least 3 times more male mice than a composition including the one or more short-range volatiles that is substantially free of the one or more long-range volatiles.

According to another embodiment, a device for attracting a mouse includes a housing or a trap and a composition including one or more long-range volatiles and one or more short-range volatiles. The one or more long-range volatiles include butyric acid, 2-methylbutyric acid, 4-heptanone, and 3-methylbutyric acid. The composition attracts at least 3 times more male mice than a composition including the one or more short-range volatiles that is substantially free of the one or more long-range volatiles. The composition is adjacent to, or included within, the housing or the trap.

According to another embodiment, a device for attracting a mouse includes a housing for receiving a mouse and a composition including one or more long-range volatiles and one or more short-range volatiles. The one or more long-range volatiles include butyric acid, 2-methylbutyric acid, 4-heptanone, and 3-methylbutyric acid. The composition attracts at least 3 times more male mice than a composition including the one or more short-range volatiles that is substantially free of the one or more long-range volatiles. The composition is adjacent to, or included within, the housing.

DETAILED DESCRIPTION

Figure 2:
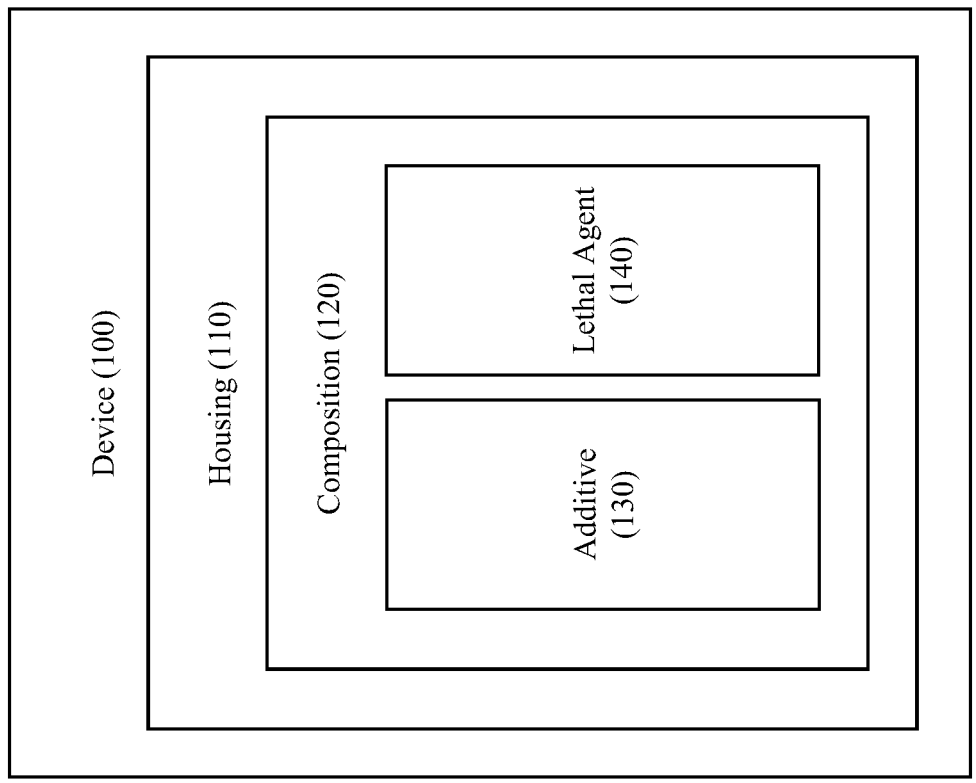
FIG. 2 depicts an example of a mouse-attracting device according to another embodiment.

The term "volatile" as used herein refers to chemicals which rapidly emanate from a source and are readily sensed by a mouse removed from the source.

The term "long-range volatile" or "long-range pheromone component" as used herein means chemicals with a molecular weight of about 150 Daltons or less and a boiling point of about 200° C. or less. Such compounds rapidly emanate from a source and are readily sensed by a mouse at a distance of 1 meter or greater.

The term "short-range volatile" or "short-range pheromone component" as used herein means chemicals with a molecular weight of 250 Daltons or greater. Such compounds are detectable by a mouse at a distance of 1 meter or less.

The term "isolated" as used herein means separated from materials with which the compound is normally associated in a native state.

The term "purified" as used herein refers to material that has been isolated under conditions that reduce, or eliminate, the presence of unrelated materials, i.e., contaminants, including native materials from which the material is obtained. Purified materials, substantially free of contaminants, can be 50% or more pure; 90% or more pure, or 99% or more pure. Purity can be evaluated by methods known in the art.

The term "synthetic" as used herein means artificially produced by chemical processes or other processes initiated by human energy, as opposed to compounds formed by natural processes.

The term "lethal" as used herein means sufficient to result in immobilization, knockdown and/or death of 50% or more, 55% or more, 60% or more, 65% or more, 70% or more, 75% or more, 80% or more, 85% or more, 90% or more, 95% or more, or 99% or more, mice.

The term "lethal agent" as used herein means an agent that is capable of immobilizing, knocking down, and/or killing 50% or more, 55% or more, 60% or more, 65% or more, 70% or more, 75% or more, 80% or more, 85% or more, 90% or more, 95% or more, or 99% or more, mice that are exposed to, or have ingested, an appropriate dose of the lethal agents over an appropriate amount of time.

The term "chemosterilant" as used herein means a substance that is capable of sterilizing 50% or more, 55% or more, 60% or more, 65% or more, 70% or more, 75% or more, 80% or more, 85% or more, 90% or more, 95% or more, or 99% or more, mice that are exposed to, or have ingested, an appropriate dose of the substance over an appropriate amount of time.

The term "mouse" as used herein refers to at least one mouse of the genus *Mus*, including the house mouse (*Mus musculus*).

The term "attractant" as used herein refers to any composition or formulation that makes attractive to a mouse or mice, a habitat, food source or other site which may be frequented or traversed by a mouse or mice. For example, the term "sex attractant pheromone component" as used herein refers to compounds that are naturally produced by mice and that make any composition or formulation attractive to a mouse or mice, a habitat, food source or other site which may be frequented or traversed by a mouse or mice. A sex attractant pheromone component may be in natural or synthetic form.

The term "sex attractant pheromone blend" as used herein refers to a composition or formulation that contains two or more sex attractant pheromone components.

The present disclosure generally relates to compositions for attracting at least one mouse such as a male mouse. Generally, the compositions can include one or more long-range volatiles. The long-range volatiles can enhance male mouse attraction either alone, or in combination with other known mouse attractants such as the short-range volatile steroids progesterone and estradiol. Generally, suitable long-range volatiles for the attraction of male mice can be produced only by female mice. In certain embodiments, the long-range volatiles can convey "female scent" (e.g., the presence of a female) but not the sexual maturity or receptivity of a female.

It is specifically theorized that the long-range volatiles described herein can enhance the attraction rate of male mice by orientating mice over long distances to the compositions described herein. As can be appreciated, short-range volatiles, such as the steroidal-type mouse attractants, have relatively high molecular masses. For example, the steroidal-type mouse attractant progesterone has a molecular weight of 314 Da and the steroidal-type mouse attractant estradiol (estrogen) has a molecular weight of 272 Da. Such high molecular weights lower the volatility of the compounds and can decrease their effective attraction range.

It has been found that addition of long-range volatiles to known short-range volatiles mouse attractants can significantly increase the rate of male mouse attraction. The rate of attraction for a composition including both long-range volatiles and short-range volatiles can result in a superior increase in the rate of male mouse attraction, resulting in an unexpected synergy when combining such volatiles. In certain embodiments, a combination of long-range volatiles and short-range volatiles can increase the attraction rate of male mice by about 3 times, in certain embodiments, about 4 times, in certain embodiments, about 5 times, and in certain embodiments, about 6 times or more.

In certain embodiments, the long-range volatiles described herein can include butyric acid, 2-methylbutyric acid, 4-heptanone, and 3-methylbutyric acid. In certain embodiments, the compositions described herein can include one, two, three, or more of the long-range volatiles. For example, in certain embodiments, the compositions described herein can include butyric acid, 2-methylbutyric acid, and 4-heptanone. The long-range volatiles can be isolated, purified, and/or synthetic in various embodiments. In certain embodiments, the one or more volatiles can include optical isomers. For example, the compositions can include racemic volatiles, such as racemic 2-methylbutyric acid, in certain embodiments.

In certain embodiments, the one or more long-range volatiles can be included in a composition in amounts where the composition substantially emanates amounts of the long-range volatiles similar to those emanating from soiled bedding of a female mouse in a predetermined period of time. For example, in certain embodiments, the one or more long-range volatiles can be included in a blend formulated to include butyric acid in about 91% by weight of the long-range volatiles, 2-methylbutyric acid in about 9% by weight of the long-range volatiles, and 4-heptanone in about 0.3% by weight of the long-range volatiles. From such blends, each of the long-range volatiles can emanate in amounts substantially similar to the amounts emanating from soiled bedding of one female mouse over 24 hours. In certain embodiments, compositions can include the one or more long-range volatiles in amounts such that the compositions release each of the long-range volatiles in amounts substantially similar to the amounts emanating from soiled bedding of one or more female mice over other time periods. For example, certain compositions can release each of the long-range volatiles in amounts substantially similar to the amounts emanating from soiled bedding of two or more female mice over 48 hours in certain embodiments. In certain embodiments, a composition can include a blend of the long-range volatiles including about 2.8 mg of butyric acid, about 0.28 mg of 2-methylbutyric acid, and about 0.1 mg of 4-heptanone. As can be appreciated, larger amounts of the long-range volatiles can emulate the presence of two or more female mice or the sustained presence of one female mouse, for example. However, excessive amounts of the long-range volatiles may be ineffective if the long-range volatiles emanate in quantities substantially different from those associated with any gathering of feral female mice.

In certain embodiments, a composition includes one or more long-range volatiles, one or more short-range volatiles, and one or more lethal agent(s) and chemosterilant(s). Suitable short-range volatiles can generally include steroidal volatiles such as progesterone and estradiol (estrogen).

In embodiments where the composition includes a lethal agent, the lethal agent can be a chemical that is capable of causing immobilization and/or death of one or more mice. For example, the chemical can be one or more of an anticoagulant and/or a toxicant. In certain embodiments, examples of suitable lethal agents can include warfarin ((RS)-4-hydroxy-3-(3-oxo-1-phenylbutyl)-2H-chromen-2-one), chlorophacinone (2-[2-(4-chlorophenyl)-1-oxo-2-phenylethyl]indane-1,3-dione), diphacinone (2-(diphenylacetyl)-1H-indene-1,3(2H)-dione), bromadiolone (3-[3-[4-(4-bromophenyl)phenyl]-3-hydroxy-1-phenylpropyl]-2-hydroxychromen-4-one), difethialone (3-[3-[4-(4-bromophenyl)phenyl]-1-tetralinyl]-2-hydroxy-4-thiochromenone), brodifacoum (3-[3-[4-(4-bromophenyl)phenyl]-1,2,3,4-tetrahydronaphthalen-1-yl]-2-hydroxychromen-4-one), and combinations thereof. In certain embodiments, suitable toxicants can include bromethalin (N-methyl-2,4-dinitro-6-(trifluoromethyl)-N-(2',4',6'-tribromophenyl)aniline), cholecalciferol ((3β,5Z,7E)-9,10-secocholesta-5,7,10(19)-trien-3-ol), zinc phosphide (zinc phosphide/trizinc diphosphide), strychnine (strychnidin-10-one), and combinations thereof.

In embodiments where the composition includes a chemosterilant, the chemosterilant can be a chemical that is capable of sterilizing one or more mice. For example, suitable chemosterilant chemicals can generally be compounds that can sterilize male mice as known in the art. Male chemosterilants can be desired due to the attraction of male mice to the long-range volatiles described herein.

In certain embodiments, the described compositions can further include a food bait. Suitable food baits can include natural foodstuffs such as meat, cheese, eggs, nuts, and/or grains. For example, a food bait can include lard and cracklings, cereal flour (e.g., oat flour and/or rice flour), cereal bran (e.g., wheat bran), gelling agent(s) (e.g., gelatin and/or agar), sugar (e.g., fructose), oil(s) (e.g., safflower oil), emulsifier(s) (e.g., soy lecithin) and humectant(s) (e.g., carrageenan gum powder), water, chemical attractants (e.g., 2-hydroxy-3-methylcyclopent-2-en-1-one, 2,3-butadione, 3-methylbutanal, 5-methyl-(E)-2-hepten-4-one, 5-methyl-4-heptanone, γ-octalactone and/or butyric acid), and combinations thereof.

As can be appreciated, the compositions can also, or alternatively, include other components. For example, natural or artificial flavorings such as milk flavor and sodium chloride can be included in certain embodiments. In certain embodiments, preservatives can also be included. As can be appreciated, sodium chloride can act as both a flavoring and as a preservative.

In certain embodiments, bittering compounds, such as denatonium benzoate, can be included to make the compositions unpalatable to humans. As can be appreciated, it can also be useful to formulate the compositions with rheology modifiers, waxes and the like to modify the consistency of the compositions described herein to facilitate their use.

In certain embodiments, the compositions can be colored through inclusion of a colorant. For example, dyes and pigments as known in the art can be used to color the compositions. In certain embodiments, colorants can be used to give the compositions a color, such as red, that provides visual warning to humans that the composition contains a potentially harmful substance such as a lethal agent. In certain embodiments, colorants can alternatively color a composition to a natural color.

In certain embodiments, the compositions described herein can be used to attract one or more mice. The composition can be used as a bait, and, can optionally be included in a trap. In certain embodiments, a composition consisting essentially of one or more long-range volatiles can be used to attract one or more mice. In certain embodiments, a composition including one or more long-range volatiles, one or more short-range volatiles, and optionally other components, can be used to attract one or more mice.

In certain embodiments, a composition including one or more long-range volatiles and, optionally one or more short-range volatiles, in an amount of about 1% to about 99% of the composition can be used to attract one or more male mice. For example, the one or more long-range volatiles and one or more short-range volatiles can be included in an amount of about 1% or more, about 2% or more, about 5% or more, about 7.5% or more, about 10% or more, about 12.5% or more, about 15% or more, about 17.5% or more, about 20% or more, about 22.5% or more, about 25% or more, about 27.5% or more, about 30% or more, about 32.5% or more, about 35% or more, about 37.5% or more, about 40% or more, about 42.5% or more, about 45% or more, about 47.5% or more, about 50% or more, about 52.5% or more, about 55% or more, about 57.5% or more, about 60% or more, about 62.5% or more, about 65% or more, about 67.5% or more, about 70% or more, about 72.5% or more, about 75% or more, about 77.5% or more, about 80% or more, about 82.5% or more, about 85% or more, about 87.5% or more, about 90% or more, about 92.5% or more, about 95% or more, about 97.5% or more, and about 99% or more, by weight of the composition. The composition can be used as a bait, and can optionally be included in a trap.

In certain embodiments, the composition can also include at least one lethal agent in an amount of about 1% to about 99% of the composition. The lethal agent can be a chemical that is capable of immobilizing or killing one or more mice. In certain embodiments, the lethal agent(s) can be included in an amount of about 1% or more, about 2% or more, about 5% or more, about 7.5% or more, about 10% or more, about 12.5% or more, about 15% or more, about 17.5% or more, about 20% or more, about 22.5% or more, about 25% or more, about 27.5% or more, about 30% or more, about 32.5% or more, about 35% or more, about 37.5% or more, about 40% or more, about 42.5% or more, about 45% or more, about 47.5% or more, about 50% or more, about 52.5% or more, about 55% or more, about 57.5% or more, about 60% or more, about 62.5% or more, about 65% or more, about 67.5% or more, about 70% or more, about 72.5% or more, about 75% or more, about 77.5% or more, about 80% or more, about 82.5% or more, about 85% or more, about 87.5% or more, about 90% or more, about 92.5% or more, about 95% or more, about 97.5% or more, and about 99% or more, by weight of the composition.

In certain embodiments, the composition can also, or alternatively, include one or more chemosterilants in an amount of about 1% to about 99% of the composition. The chemosterilant(s) can be a chemical that is capable of sterilizing one or more mice. In certain embodiments, the chemosterilant(s) can be effective to sterilize male mice. In certain embodiments, the chemosterilant(s) can be included in an amount of about 1% or more, about 2% or more, about 5% or more, about 7.5% or more, about 10% or more, about 12.5% or more, about 15% or more, about 17.5% or more, about 20% or more, about 22.5% or more, about 25% or more, about 27.5% or more, about 30% or more, about 32.5% or more, about 35% or more, about 37.5% or more, about 40% or more, about 42.5% or more, about 45% or more, about 47.5% or more, about 50% or more, about 52.5% or more, about 55% or more, about 57.5% or more, about 60% or more, about 62.5% or more, about 65% or more, about 67.5% or more, about 70% or more, about 72.5% or more, about 75% or more, about 77.5% or more, about 80% or more, about 82.5% or more, about 85% or more, about 87.5% or more, about 90% or more, about 92.5% or more, about 95% or more, about 97.5% or more, and about 99% or more, by weight of the composition.

In certain embodiments, the composition can consist essentially of butyric acid, 2-methylbutyric acid, 4-heptanone, progesterone, and estradiol (estrogen) and a lethal agent.

In certain embodiments described herein, a composition that attracts one or more mice can be formulated as a granule, a solid block, a gel, a powder, a paste, a liquid, an aerosolized composition, or as combinations thereof. As can be appreciated, the compositions described herein can be applied in any suitable manner. For example, the compositions can be applied as a solid, a semi-solid, a liquid, or an aerosol using appropriate devices.

As can be appreciated, any of the compositions described herein can be included in a device for attracting one or more mice. The device can include a composition including one or more long-range volatiles and, optionally, one or more short-range volatiles. In certain embodiments, the compositions can also optionally include one or more of a lethal agent and a chemosterilant. In certain embodiments, the device can include a housing for receiving at least one mouse. The composition can be adjacent to, or included, within the housing. The housing can also include a food bait that is adjacent to, or included within, the composition. The housing can allow a mouse to enter and leave the device after ingesting the composition. The housing can be configured so that a mouse can enter the device, but other animals are less likely able to enter the device. For example, the housing can contain a size-restrictive entryway, and the housing can optionally include a sharp turn. The device can be reusable (e.g., be re-baitable) or can be a single-use device.

The device can also include, or alternatively be, a trap. The trap can be an immobilizing trap (e.g., a sticky trap or a chamber trap), an impaling trap, a snap trap, an asphyxiation trap (e.g., a drowning trap, or a noose-based trap), an electrocution trap, a skull-fracturing piston trap, a catch-and-release trap, a self-resetting trap capable of multiple killings, or combinations thereof.

As can be appreciated, the device can trap, or kill, more than one mouse in certain embodiments. For example, a device for attracting one or more mice can include multiple single-use traps, a plurality of chambers that can each trap one mouse, or a single chamber that can trap or kill multiple mice in various embodiments.

Other variations to the device are also possible in certain embodiments. For example, a device can automatically kill and remove a mouse in certain examples. In such examples, a mouse can be lured into a trap housing that kills the mouse using, for example, an impaling trap, a compression trap, an asphyxiation trap, an electrocution trap, or a skull-fracturing piston trap. Once the mouse has been killed, the trap can reset itself releasing the mouse to fall out of both the trap housing and the device. As can be appreciated, such devices can kill multiple mice without human intervention. In certain embodiments, such devices can be mechanically powered (using e.g., a compressed gas cartridge) or can be electrically powered.

As can be appreciated, other devices are also possible in certain embodiments. For example, in certain embodiments, a device for attracting mice can be a dispensing device or a dispersing device which dispenses, disseminates, releases, and/or disperses a composition as described herein using a device such as an aerosol device, a trigger sprayer device, a pump sprayer device, or the like. As can be appreciated, the composition in such embodiments can be an aerosolized liquid or the like.

Figure 1:
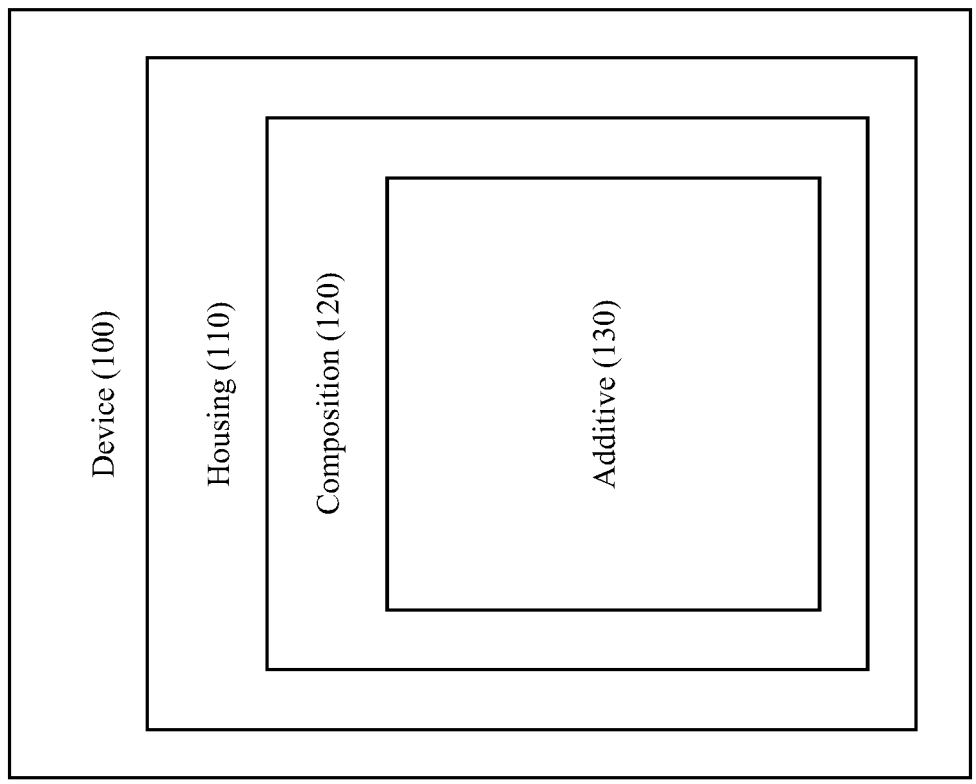
FIG. 1 depicts an example of a mouse-attracting device according to one embodiment.

In certain embodiments, a device can include a housing for receiving a mouse, as well as a composition comprising one or more long-range volatiles. Referring to FIG. 1, a device according to one embodiment is disclosed. The device (100) can include a housing (110). The housing (110) can include composition (120), which includes additive (130). In certain embodiments, the housing (110) can also include at least one food bait. In certain embodiments, the housing (110) can also include a trap. The composition (120) can be included within, or adjacent to, the trap within housing (110).

Referring to FIG. 2, a device according to an embodiment is disclosed. The device (100) can include a housing (110). The housing (110) can include composition (120), which includes additive (130) and lethal agent (140). In certain embodiments, housing (110) can also include at least one food bait. In certain embodiments, housing (110) can also include a trap. The composition (120) can be included within, or adjacent to, the trap within housing (110).

Figure 3:
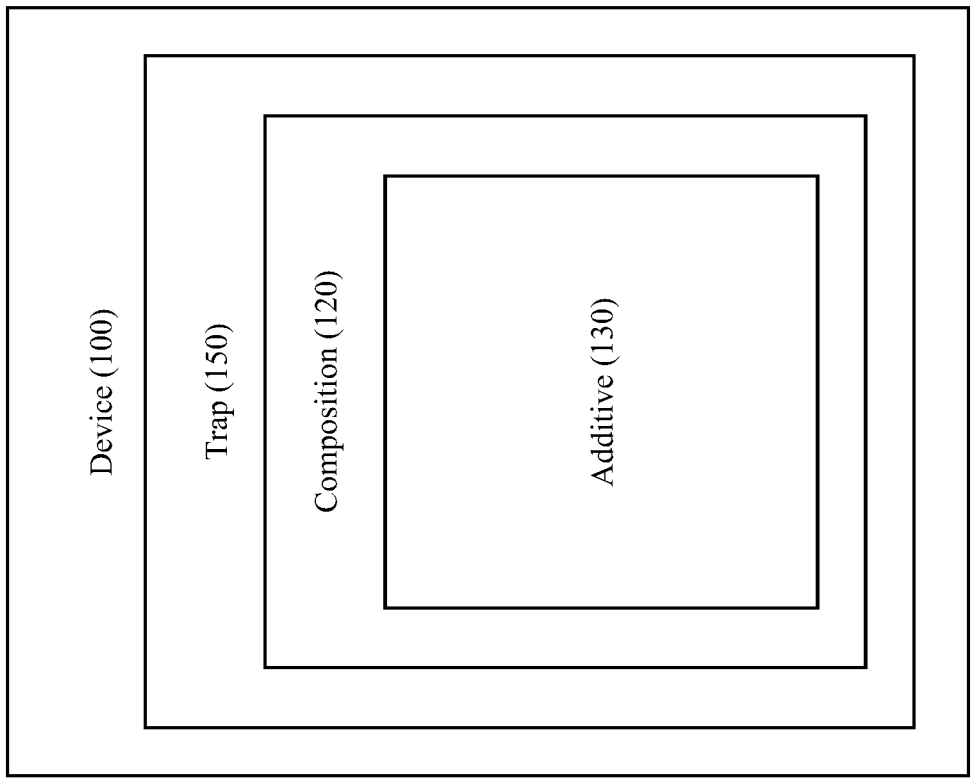
FIG. 3 depicts an example of a mouse-attracting device according to another embodiment.

Referring to FIG. 3, a device according to an embodiment is disclosed. The device (100) can include trap (150). The trap (150) can include composition (120), which includes additive (130). In certain embodiments, the trap (150) can also include at least one food bait. In certain embodiments, trap (150) can also include a housing. The composition (120) can be included within, or adjacent to the housing within trap (150).

Figure 4:
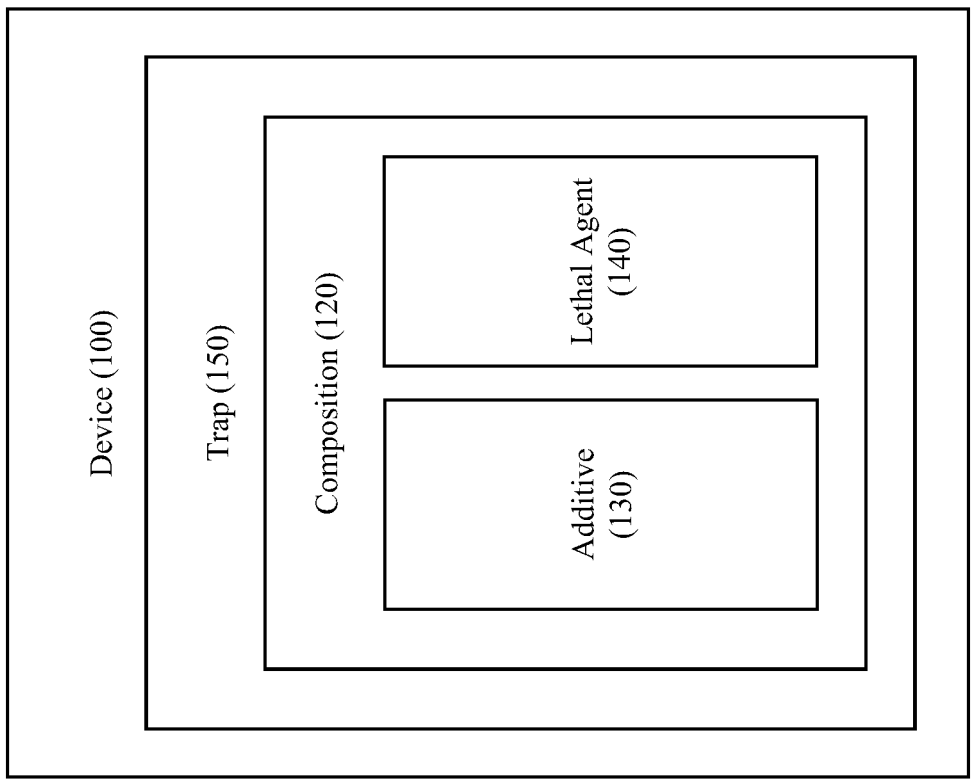
FIG. 4 depicts an example of a mouse-attracting device according to another embodiment.

Referring to FIG. 4, a device according to an embodiment is disclosed. The device (100) can include trap (150). The trap (150) can include composition (120), which includes additive (130) and lethal agent (140). In certain embodiments, trap (150) can also include at least one food bait. In certain embodiments, trap (150) can also include a housing. The composition (120) can be included within, or adjacent to, the housing within trap (150).

Figure 5:
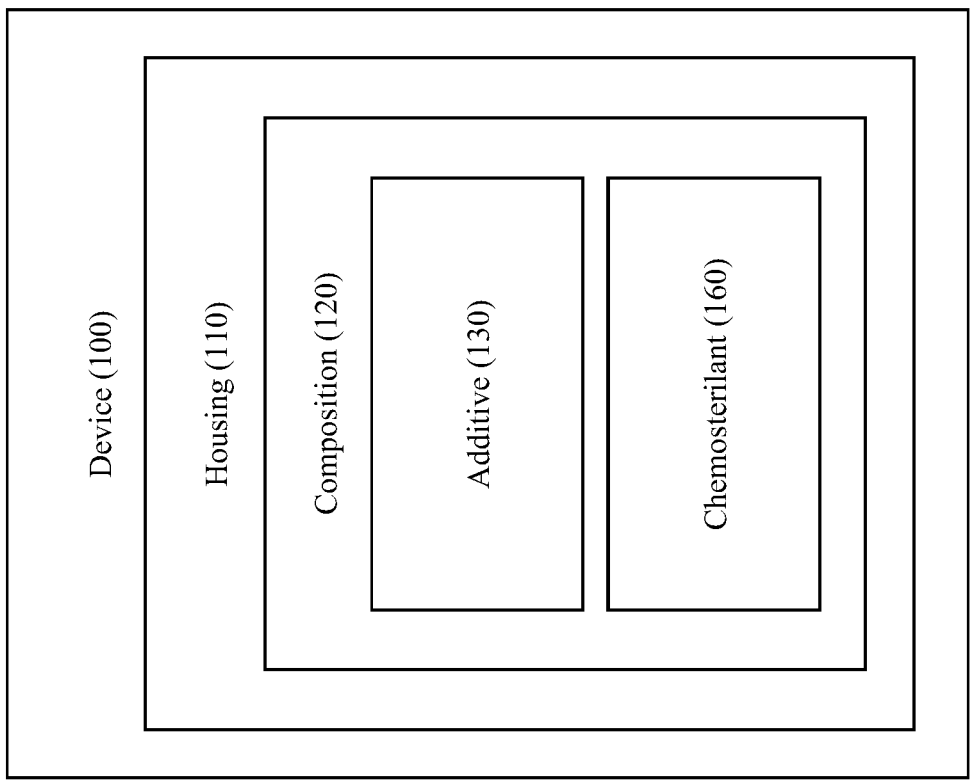
FIG. 5 depicts an example of a mouse-attracting device according to another embodiment.

Referring to FIG. 5, a device according to an embodiment is disclosed. The device (100) can include housing (110). The housing (110) can include composition (120), which includes additive (130) and chemosterilant (160). In certain embodiments, the housing (110) can also include at least one food bait. In certain embodiments, the housing (110) can also include a trap. The composition (120) can be included within, or adjacent to, the trap within housing (110).

Figure 6:
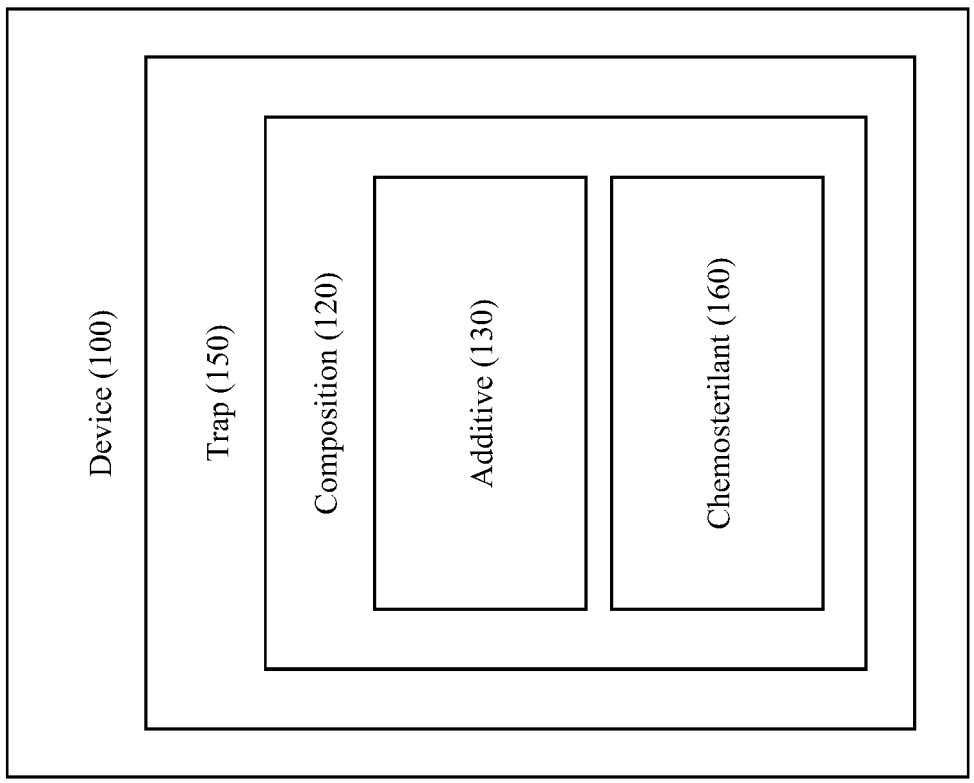
FIG. 6 depicts an example of a mouse-attracting device according to another embodiment.

Referring to FIG. 6, a device according to an embodiment is disclosed. The device (100) can include trap (150). The trap (150) can include composition (120), which includes additive (130) and chemosterilant (160). In certain embodiments, trap (150) can also include at least one food bait. In certain embodiments, trap (150) can also include a housing. The composition (120) can be included within, or adjacent to, the housing within trap (150).

Figure 7:
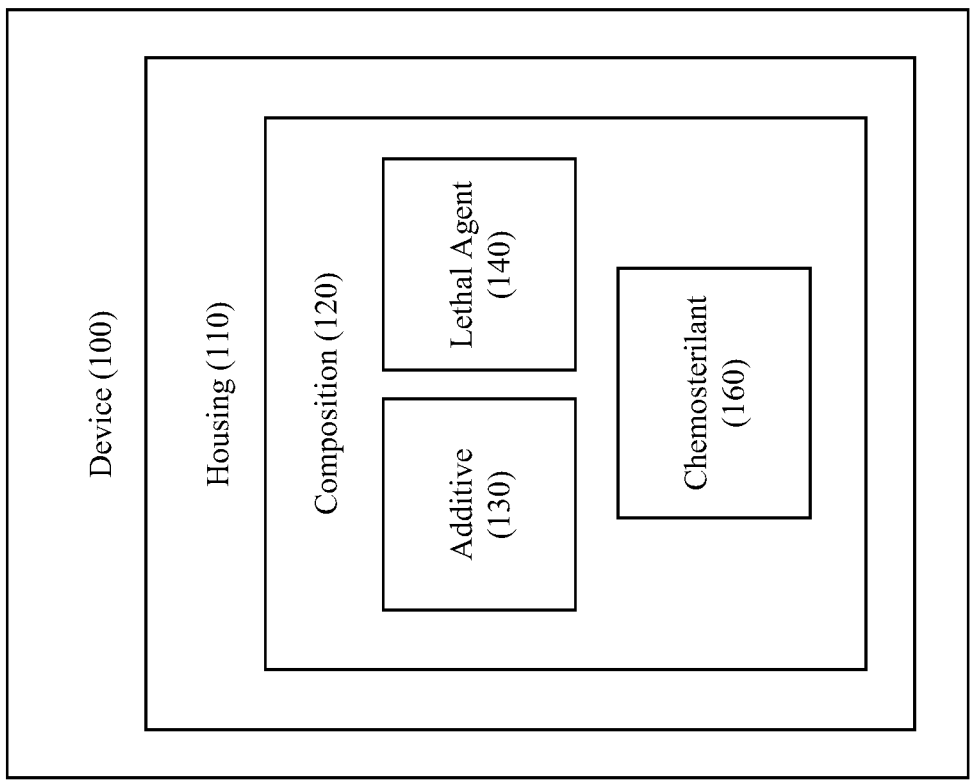
FIG. 7 depicts an example of a mouse-attracting device according to another embodiment.

Referring to FIG. 7, a device according to an embodiment is disclosed. The device (100) can include housing (110). The housing (110) can include composition (120), which includes additive (130), lethal agent (140), and chemosterilant (160). In certain embodiments, the housing (110) can also include at least one food bait. In certain embodiments, the housing (110) can also include a trap. The composition (120) can be included within, or adjacent to, the trap within housing (110).

Figure 8:
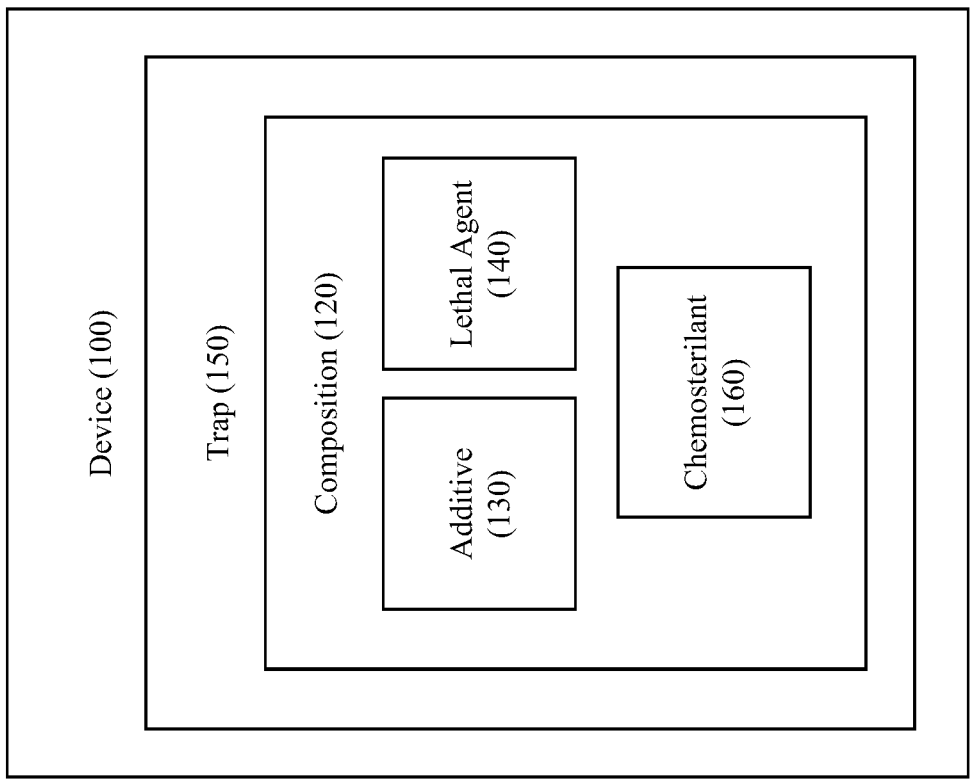
FIG. 8 depicts an example of a mouse-attracting device according to another embodiment.

Referring to FIG. 8, a device according to an embodiment is disclosed. The device (100) can include trap (150). The trap (150) can include composition (120), which includes additive (130), lethal agent (140), and chemosterilant (160). In certain embodiments, the trap (150) can also include at least one food bait. In certain embodiments, the trap (150) can also include a housing. The composition (120) can be included within, or adjacent to, the housing within trap (150).

Any of the compositions described herein can be used to attract one or more mice. The one or more mice can be attracted by providing any of the compositions described herein. The one or more mice can also be immobilized and/or killed by providing any of the compositions described herein with a lethal agent. The one or more mice can also be sterilized by providing any of the compositions described herein with a chemosterilant. The composition can be provided in a dose that can be sufficient to result in the attraction, and optionally, the sterilization, immobilization, and/or death of one or more mice.

EXAMPLES

Source and Maintenance of the Mouse Colony

House mice, *Mus musculus* (strain: CD-1®), were obtained from Charles River Laboratories Ltd. (Saint-Constant, QC J5A 2E7, Canada) and cared for by Animal Care Services of Simon Fraser University ("SFU"). On arrival, mice were assigned to nine groups of five female mice each and nine groups of five male mice each. Each group was accommodated in cages (50 cm×40 cm×20 cm) lined with commercial corn cob bedding (Anderson's Bed o'cobs, The Andersons Inc. Maumee, Ohio 43537, USA), provided with Nalgene toys, running wheels (Jaimesons Pet Food Distributers, Richmond, BC V4G 1C9, Canada), and provisioned with commercial rodent food (LabDiet® Certified Rodent Diet, LabDiet, St Louis, Mo. 64144, USA) as well as water ad libitum.

Identification of Long-Range Volatiles of Female House Mice

The long-range volatiles emanating from urine and feces deposits of female house mice were identified using the soiled bedding of female and male mice aging from 33 days to 56 days. Female specific long-range volatiles were theorized to act as sex attractant pheromone components. As mice progressed from juveniles to adults, urine- and feces-soiled bedding from nine groups of five females each, and nine groups of five males each, were collected and replaced with fresh bedding at three-day intervals. The combined soiled bedding from each of three groups of females (450 g), and each of the three groups of males (450 g), was placed into separate Pyrex glass chambers (30×15 cm) each connected to a Pyrex glass tube (15 cm×5 mm OD) filled with the adsorbent Porapak Q (200 mg) serving as a volatile trap. Charcoal-filtered air was drawn through each chamber and the Porapak Q volatile trap at a flow of 1 L per minute. After capturing urine and feces odorants on Porapak Q for 24 hours, odorants were desorbed with consecutive rinses of pentane (2 ml) and ether (2 ml). After adding dodecyl acetate as an internal standard, extracts were concentrated to 250 μl per sample.

Aliquots (2 μl) of each sample were analyzed by coupled gas chromatography mass spectroscopy ("GC-MS"), using a Varian Saturn Ion Trap GC-MS. The GC-MS instrument was fitted with a DB-5 MS GC column (30 m×0.25 mm ID; Agilent Technologies Inc., Santa Clara, Calif. 95051, USA) using helium as the carrier gas (35 cm per second), and run using the following temperature program: 40° C. for 5 min, 10° C. per min until 280° C. (5 min). The injector port was set at 250° C. and the ion trap at 200° C.

Odorants were identified by comparing their retention indices (relative to straight chain alkanes) and mass spectra with those of authentic standards purchased from suppliers or synthesized in the laboratory. Volatiles that were either female-specific or increased in abundance as females progressed to sexual maturity were considered candidate sex attractant pheromone components.

Table 1 depicts the volatiles identified in the soiled bedding of female and male mice.

TABLE 1

| | Mean abundance (%) | |
| --- | --- | --- |
| Compound | Female | Male |
| 2-pentanone | 0.18 | 0.4 |
| 3-methyl-3-buten-1-ol | 6.96 | 4.6 |
| 3-methyl-2-pentanone | 0.01 | 0.33 |
| 1-pentanol | 0.27 | 0.35 |
| 3-methyl-2-buten-1-ol | 0.20 | 0.42 |
| butyric acid | 29.74 | 0.0 |
| Unknown | 0.37 | 2.25 |
| 3-methylbutyric acid | 3.30 | 0.0 |
| 2-methylbutyric acid | 1.14 | 0.0 |
| 1-hexanol | 0.15 | 1.88 |
| 4-heptanone | 1.52 | 0.0 |
| 2-heptanone | 32.83 | 43.6 |
| E5-2-heptenone | 5.6 | 4.06 |
| 2-acetyl-pyrroline | 0.12 | 1.03 |
| E3-2-heptenone | 2.3 | 2.15 |
| Unknown | 0.39 | 2.12 |
| 6-methyl-3-heptanone | 6.39 | 4.44 |
| dimethyl trisulfide | 0.46 | 1.2 |
| 1-octen-3-ol | 1.68 | 2.46 |
| 3,4-dehydro-exo-brevicomin | 2.84 | 7.4 |
| Acetophenone | 1.64 | 3.61 |
| 2-sec-butyl-4,5-dihydrothiazole | 0.0 | 5.56 |
| 2,3,5-trithiahexane | 0.12 | 8.91 |
| 2-undecanone | 0.21 | 0.13 |
| trans-caryophyllene | 0.21 | 0.3 |
| Geranylacetone | 0.24 | 0.69 |
| β-farnesene | 0.39 | 1.37 |
| α-humulene | 0.73 | 0.74 |

Figure 9:
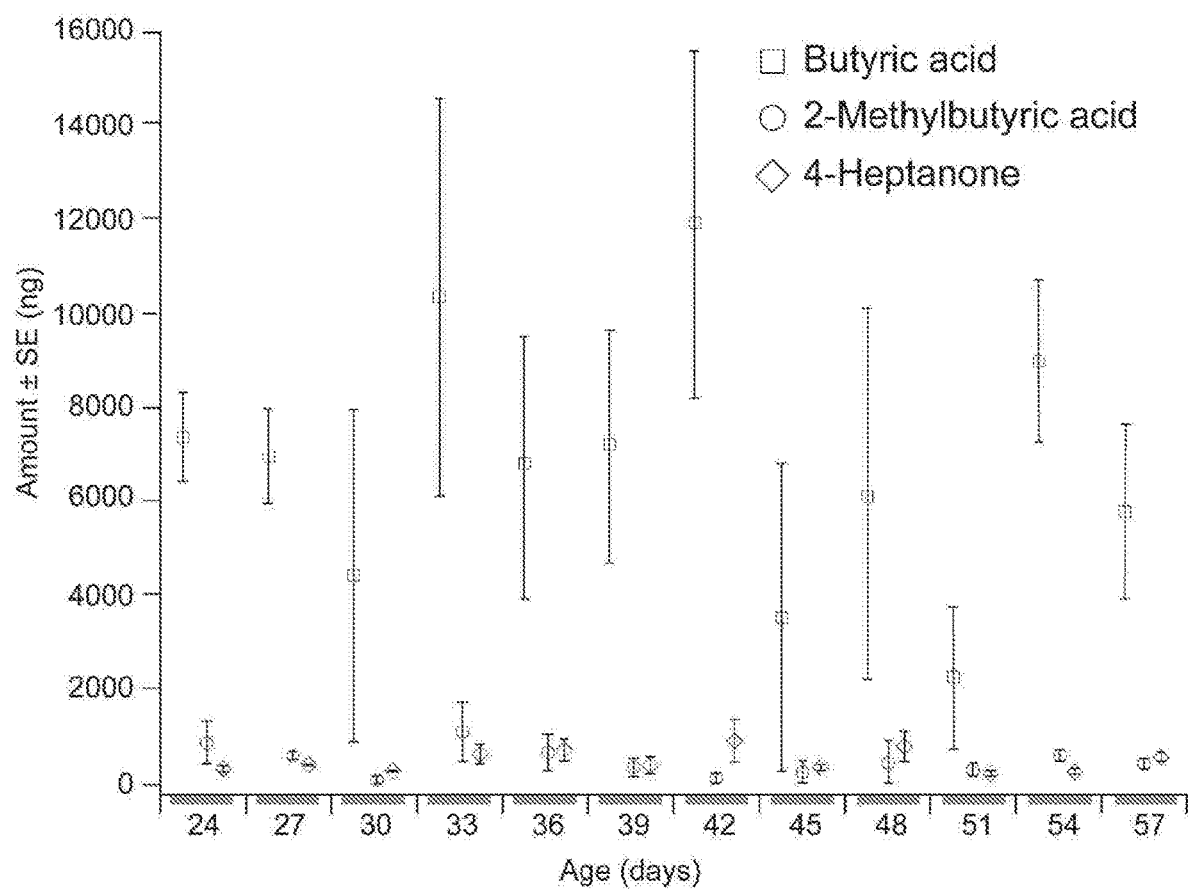
FIG. 9 depicts a graph showing the mean amount of three volatile sex pheromone components in the headspace of bedding soiled by female house mice at different ages.

As depicted in Table 1, GC-MS analyses of headspace volatiles emanating from urine- and feces-soiled bedding of female mice revealed a variety of odorants comprising acids, ketones, alcohols, sesquiterpenes as well as sulfur- and nitrogen-containing compounds that varied greatly in relative abundance. Compared to headspace volatiles of bedding soiled with urine and feces from male mice, four volatiles were female-specific: butyric acid, 2-methylbutyric acid, 3-methylbutyric acid, and 4-heptanone. While these components differed in absolute amounts, the relative abundance of butyric acid, 2-methylbutyric acid, and 4-heptanone did not increase as female mice progressed from juveniles to adults as depicted in FIG. 9.

To determine the absolute configuration of 2-methylbutyric acid, the 2-methylbutyric acid produced by female house mice was derivatized to the corresponding ethyl ester and this ethyl ester derivative was analyzed on a chiral gas chromatographic column in comparison to ethyl ester derivatives of synthetic 2-methylbutyric acid and (S)-2-methylbutyric acid.

To esterify mouse-produced 2-methylbutyric acid, 75-μl aliquots of each of three Porapak Q headspace volatile extracts were combined in one sample that then contained about 500 ng per μl of 2-methylbutyric acid. After concentrating the sample to 50 μl, 10 μl each of dimethylaminopyridine (50 μg/μl) and absolute ethanol as well as 20 μl of dicyclohexylcarbodiimide (220 μg/μl) were added. This sample was kept overnight at room temperature before 100 μl of pentane were added. Aliquots (2 μl) of this sample were analyzed isothermally (70° C.) by GC, using a 6890 Agilent GC (Agilent Technologies Inc.) fitted with a CP Chirasil Dex CB column [25 m×0.25 mm ID; Varian Inc. (now Agilent), Lake Forest, Calif. 92630, USA], and setting the injector and FID detector to 240° C.

Figure 10:
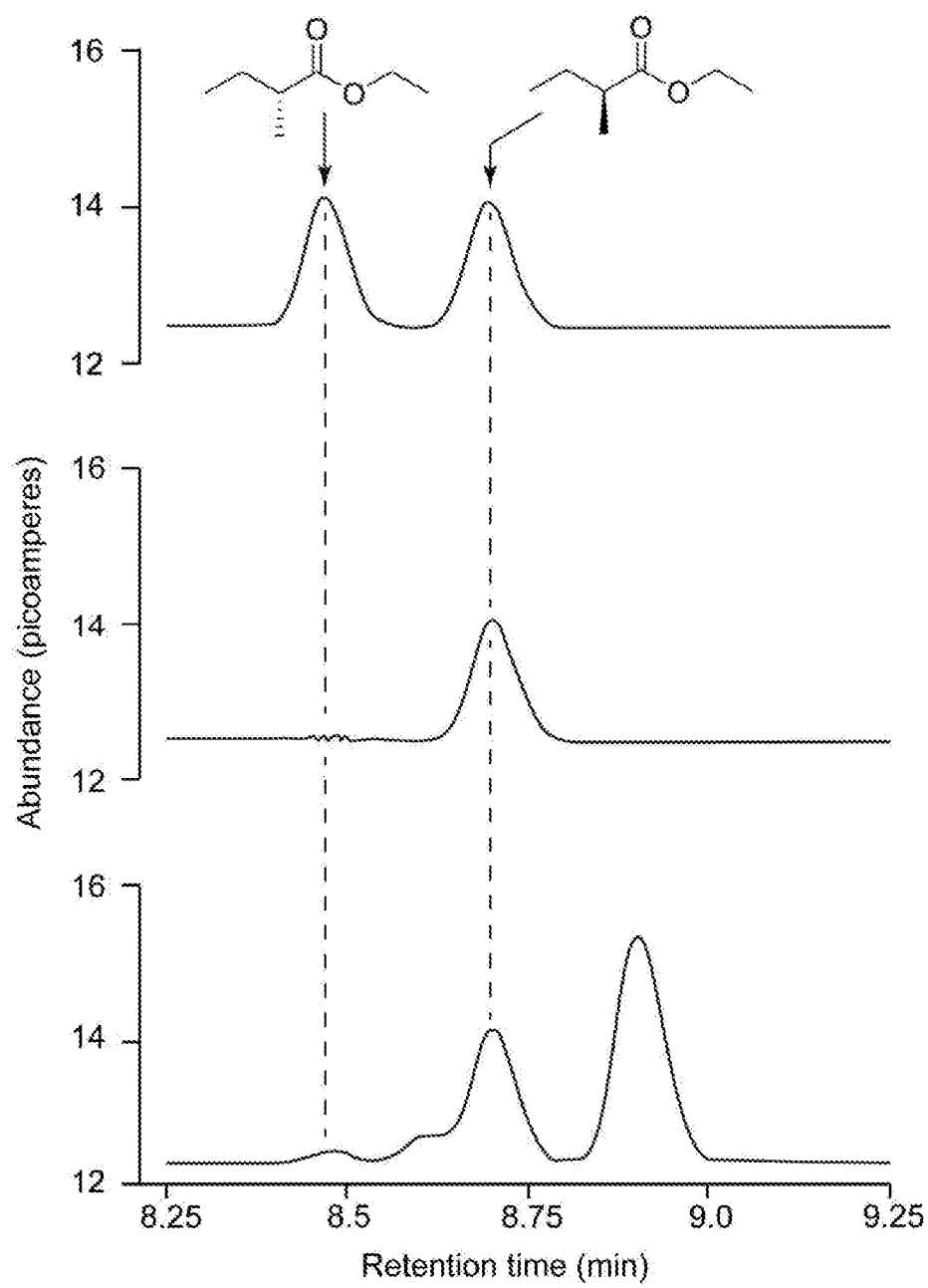
FIG. 10 depicts, top to bottom, comparative gas chromatograms of the ethyl ester derivatives of 2-methylbutyric acid, synthetic (S)-2-methylbutyric acid, and 2-methylbutyric acid produced by female house mice.

Comparative chiral gas chromatography determined that female house mice produce predominantly the S-enantiomer of 2-methylbutyric acid, as depicted in FIG. 10.

Gas chromatogratographic-mass spectrometric analyses can be used to determine the amount of long-range volatiles emanating from the soiled bedding of a female mouse over a period of time. Specifically, by comparing the peak area integrations of the long-range volatiles to the peak area integration of an internal standard (e.g., dodecyl acetate) in a gas chromatogram of soiled bedding headspace volatiles from a female house mouse over a selected period of time, the amount of the each of the long-range volatiles emanating from the soiled bedding can be determined.

It was determined that the soiled bedding of a female mouse emanates about 450 ng of butyric acid, 32 ng of 2-methylbutyric acid, and 70 ng of 4-heptanone over a period of 24 hours.

Experiment 1: Field Test of Long-Range Volatiles Identified as Candidate Sex Attractant Pheromone Components of Female House Mice The ability of the long-range volatiles identified as candidate sex attractant pheromones (e.g., butyric acid, 2-methylbutyric acid, and 4-heptanone), to enhance the attractiveness of the short-range sex attractant pheromone components, progesterone and estradiol, as a trap lure, were tested in a field experiment. All data were collected from wild house mice in the field, rather than from laboratory-strain mice, because population of wild mice are the targets in trapping programs. Progesterone and estradiol were previously shown to be effective house mouse pheromone components in PCT Patent App. No. PCT/CA2017/050618.

Figure 11A:
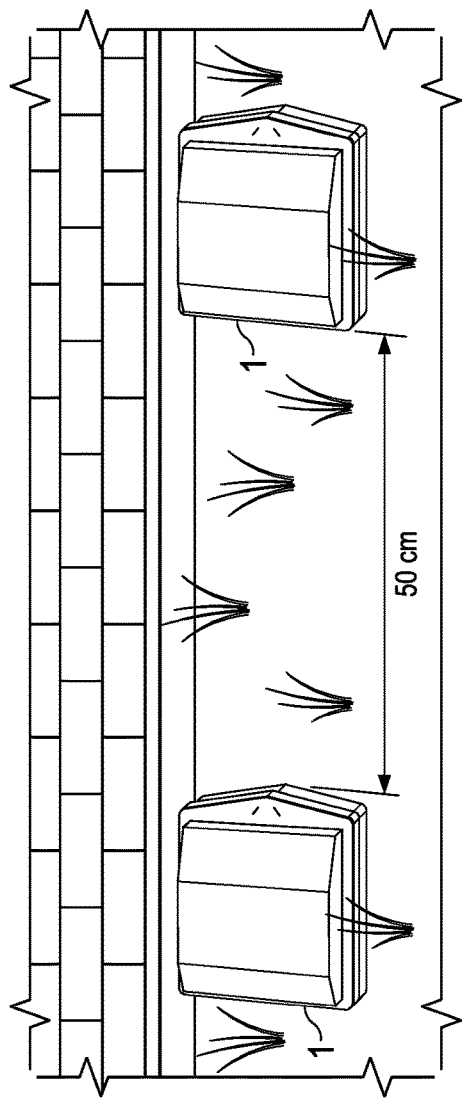
FIGS. 11A and 11B depict an illustration of an experimental design for behavioral experiments on mouse capture rates.
Figure 11B:
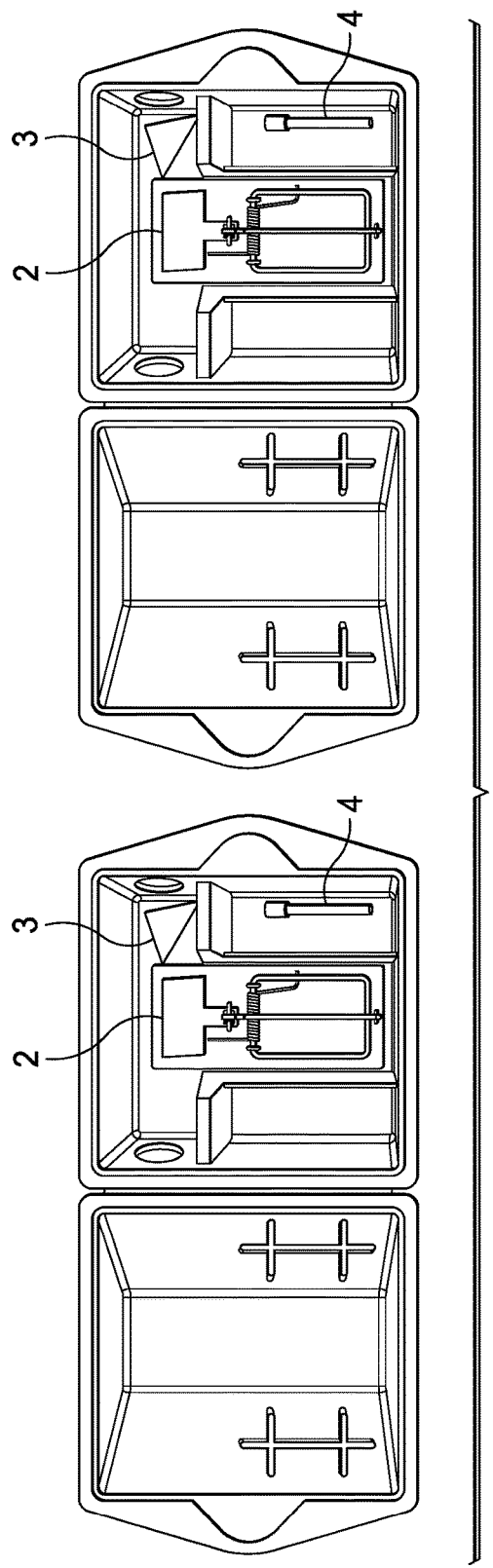

Experimental replicates were set up along interior or exterior walls of a bird conservatory, livestock production facility, and a horse stable. Each replicate (n=193) consisted of paired trap boxes depicted in FIGS. 11A and 11B. The paired trap boxes, each labeled 1, (PROTECTA® Mouse, Bell Laboratories Inc. Madison, Wis. 53704, USA) were spaced 0.5-m apart and there was approximately 2 meters between pairs (not shown). As depicted in FIG. 11B, each trap box, labeled 1, contained a snap trap (M325 M7 Pro mouse Woodstream Co., Lititz, Pa. 175543, USA), labeled 2, that was baited with the food bait used in PCT Patent App. No. PCT/CA2017/050498. Each of the trap boxes further included a triangular piece of filter paper, (Whatman #1, 120 mm, Maidstone, England, 01622), labeled 3, that was treated with a blend of the known short-range pheromone components progesterone (250 ng) and estradiol (125 ng) dissolved in 50 μl of ether.

Each of the trap boxes was randomly assigned a control or treatment stimulus contained in a 400-μl polyethylene microcentrifuge tube (Evergreen Scientific, 18704 South Ferris Place, Rancho Dominguez, Calif. 90220), labelled 4, with a pierced (1.5 mm) lid. The treatment microcentrifuge tube contained a blend of the long-range candidate pheromone components consisting of 2.8 mg of butyric acid, 0.28 mg of 2-methylbutyric acid, and 0.1 mg of 4-heptanone formulated in 200-μl of mineral oil. The ratio and release rates of the blend of long-range candidate pheromone components were equivalent to those emanating from the soiled bedding of one female over 24 hours. The microcentrifuge tube in the corresponding control trap box contained 200 μl of mineral oil.

Twice every week, paired trap boxes were checked, and food baits and pheromone lures replaced. Whenever a mouse had been captured, its sex and age (juvenile or adult based on body size and genitalia development) were recorded, and a new trap box and snap trap were deployed. This procedure ensured that the odor of captured mice did not affect future captures. The position of the treatment and the control trap within paired trap boxes was re-randomized after each capture.

Figure 12:
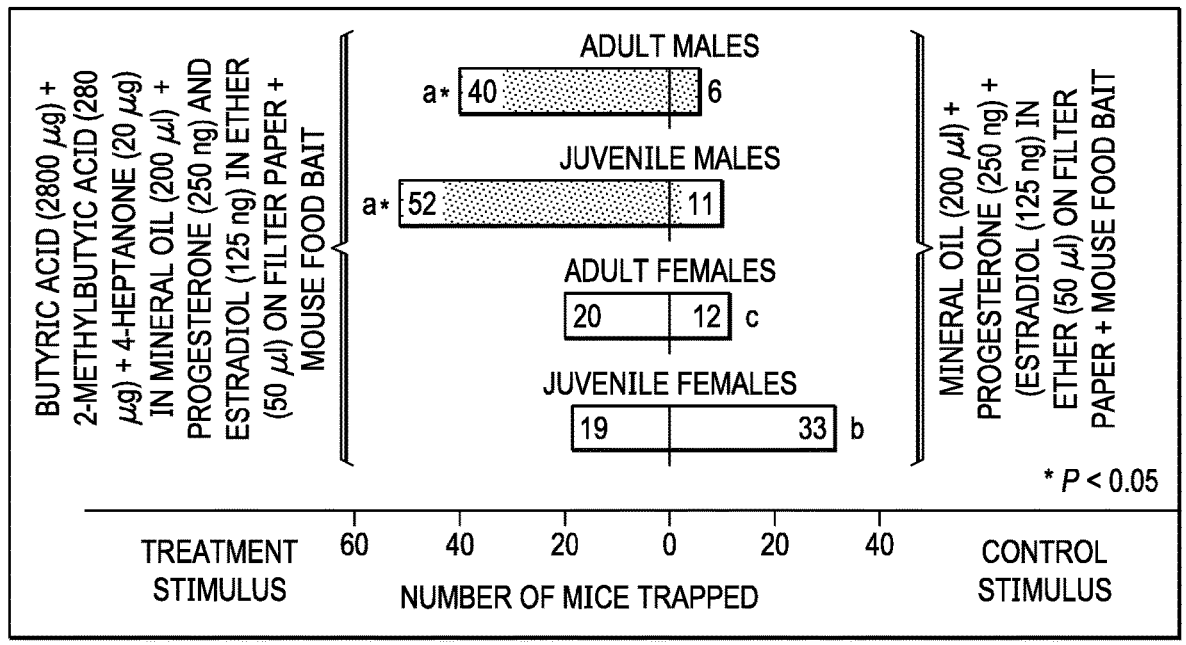
FIG. 12 depicts mean captures of house mice in paired traps baited either with a blend of short-range and long-range sex attractant pheromone components or the short-range sex attractant pheromone components alone as a control.

As depicted in FIG. 12, treatment traps baited with the blend of long-range volatiles identified as candidate sex attractant pheromones captured significantly more adult males ($\chi^2$=25.13; P<0.0001) and more juvenile males ($\chi^2$=26.68; P<0.0001) than the control traps. Out of 46 adult males captured, 40 were captured in traps baited with the long-range volatile sex attractant pheromone blend. As a trap lure, this blend of long-range sex attractant pheromone components had no significant effect on captures of adult female mice ($\chi^2$=2.0; P=0.16) and juvenile female mice ($\chi^2$=3.25; P=0.07). The probability of capturing a mouse of a particular age or sex differed based on the trap lure (logistic regression analysis; Tukey's test for multiple comparisons of trapping probabilities; P<0.05). In a trap baited with both the blend of long-range volatiles and short-range volatiles (e.g., the steroids progesterone and estradiol), the probability of capturing adult males and juvenile males was 0.87 and 0.83, respectively, whereas the probability of capturing adult females and juvenile females was 0.63 and 0.37, respectively.

The results of Experiment 1 illustrate the synergistic effect of the blend of long-range sex attractant pheromone components and short-range sex attractant pheromone components on the capture rate of juvenile and adult male house mice. As can be appreciated, traps baited with a blend of progesterone and estradiol (estrogen) alone afforded captures of adult male house mice and juvenile male house mice 9-fold and 21-fold, respectively (see, e.g., PCT Patent App. No. PCT/CA2017/050618), greater than those in traps lacking any pheromone lure. Compared to the trap lure of the short-range pheromone components, progesterone and estradiol (estrogen) alone, the present trap lure combination of the short-range pheromone components progesterone and estradiol (estrogen) with the present blend of long-range volatiles resulted in a further 6.6 fold and 4.7 fold increase in the capture rate of adult male house mice and juvenile male house mice, respectively. Such an increase demonstrates that the addition of long-range pheromone components (butyric acid, 2-methylbutyric acid, and 4-heptanone) to short-range pheromone components (progesterone and estradiol (estrogen)) synergistically increases the attractiveness of a pheromone lure composition and the resulting capture rates of mice.

Experiment 2: Field Test of the Long-Range Sex Attractant Pheromone Components of Female House Mice A second field experiment was performed to test the ability of the short-range pheromone components progesterone and estradiol to enhance the attractiveness of the long-range sex attractant pheromone components butyric acid, 2-methylbutyric acid, and 4-heptanone. The design was identical to that of Experiment 1 except that both trap boxes in each pair (31 replicates) were baited with the long-range sex attractant pheromone components but only the treatment trap box received progesterone and estradiol.

Figure 13:
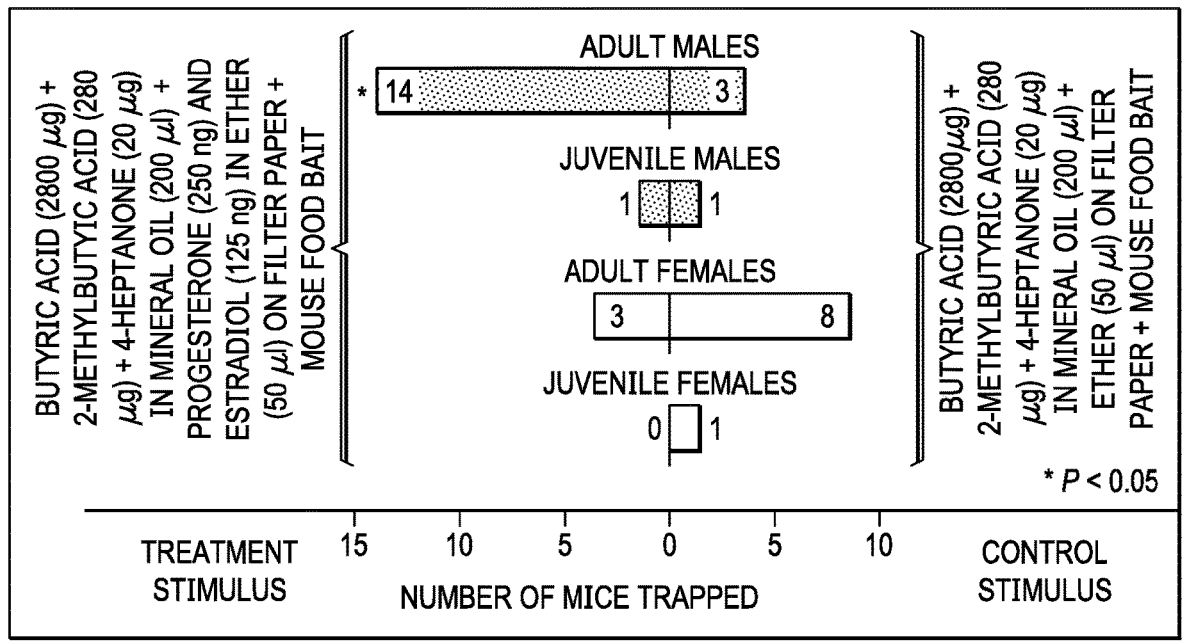
FIG. 13 depicts mean captures of house mice in paired traps baited either with a blend of short-range and long-range sex attractant pheromone components or the long-range sex attractant pheromone components alone as a control.

As depicted in FIG. 13, in Experiment 2, treatment traps baited with the blend of the long-range sex attractant pheromone components and the short-range sex attractant pheromone components progesterone and estradiol captured significantly more adult males ($\chi^2=5.06$; P=0.024), and fewer adult females ($\chi^2=3.27$; P=0.07), than the control trap boxes baited only with the blend of the long-range sex attractant pheromone components. The data of juvenile males and juvenile females in this experiment were too low to reveal a behavior-modifying effect attributable to the blend of long-range sex attractant pheromone components.

The combined data of the Experiments 1 and 2 reveal a synergistic effect between the blend of long-range sex attractant pheromone components (butyric acid, 2-methylbutyric acid, 4-heptanone) and the short-range sex attractant pheromone components (steroidal progesterone and estradiol), which—in combination—attracted 6.6 times more adult males than the steroids alone (Exp. 1) and 4.3 times more adult males than the blend of long-range sex attractant pheromone components alone (Exp. 2). Thus, pheromone components of low and high volatility act synergistically in the attraction of prospective mates.

The following documents are hereby incorporated by reference in their entireties: Brigham, A. J. and R. M. Sibly, A review of the phenomenon of neophobia (1999); Beny Y, Kimchi T (2014) Innate and learned aspects of pheromone-mediated social behaviours. Anim Behav 97:301-311; Hurst J L, Robertson D H L, Tolladay U, Beynon R J (1998) Proteins in urine scent marks of male house mice extend the longevity of olfactory signals. Anim Behav 55:1289-1297; Jemiolo B, Harvey S, Novotny M (1986) Promotion of the Whitten effect in female mice by synthetic analogs of male urinary constituents. Proc Natl Acad Sci USA 83:4576-4579; Liebich H M, Zlatkis A, Bertsch W, Van Dahm R, Whitten W K (1977) Identification of dihydrothiazoles in urine of male mice. Biol Mass Spectrom 4:69-72; Mucignat-Caretta C (2002) Modulation of exploratory behavior in female mice by protein-borne male urinary molecules. J Chem Ecol 28:1853-1863; Mucignat-Caretta C, Caretta A (1999) Chemical signals in male house mice urine: protein-bound molecules modulate interactions between sexes. Behaviour 136:331-343; and Novotny MV (2003) Pheromones, binding proteins and receptor responses in rodents. Biochem Soc Trans 31(Pt 1):117-122.

As used herein, all percentages (%) are percent by weight of the total composition, also expressed as weight/weight %, % (w/w), w/w, w/w % or simply %, unless otherwise indicated. Also, as used herein, the terms "wet" refers to relative percentages of the composition in a dispersion medium (e.g., water); and "dry" refers to the relative percentages of the dry composition prior to the addition of the dispersion medium. In other words, the dry percentages are those present without taking the dispersion medium into account. Wet admixture refers to the composition with the dispersion medium added. "Wet weight percentage", or the like, is the weight in a wet mixture; and "dry weight percentage", or the like, is the weight percentage in a dry composition without the dispersion medium. Unless otherwise indicated, percentages (%) used herein are dry weight percentages based on the weight of the total composition.

The dimensions and values disclosed herein are not to be understood as being strictly limited to the exact numerical values recited. Instead, unless otherwise specified, each such dimension is intended to mean both the recited value and a functionally equivalent range surrounding that value.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather, it is hereby intended the scope be defined by the claims appended hereto.

What is claimed is:

1. A composition for attracting a mouse comprising:
   long-range volatiles consisting of butyric acid, 2-methylbutyric acid, and 4-heptanone; and
   short-range volatiles consisting of progesterone and estrogen; and
   wherein the long-range volatiles are isolated, synthetic, or purified
   wherein the long-range volatiles are isolated, synthetic, or purified.

2. The composition of claim 1, wherein the long-range volatiles consist of about 91 wt %, by weight, butyric acid, about 9 wt %, by weight, 2-methylbutyric acid, and about 0.32 wt %, by weight, 4-heptanone.

3. The composition of claim 1, wherein the long-range volatiles consist of about 2.8 mg of butyric acid, about 0.28 mg of 2-methylbutyric acid, and about 0.1 mg of 4-heptanone.

4. The composition of claim 1 releases each of the long-range volatiles in an amount substantially similar to the amount emanating from the soiled bedding of one female mouse over a period of 24 hours.

5. The composition of claim 1 releases about 450 ng of butyric acid, 32 ng of 2-methylbutyric acid, and 70 ng of 4-heptanone over a period of about 24 hours.

6. The composition of claim 1, further comprising a lethal agent.

7. The composition of claim 6 comprises a dose of the lethal agent sufficient to kill or immobilize a mouse.

8. The composition of claim 6, wherein the lethal agent comprises a chemical capable of killing or immobilizing a mouse.

9. The composition of claim 8, wherein the chemical comprises one or more of an anticoagulant and a toxicant.

10. The composition of claim 9, wherein the anticoagulant comprises one or more of warfarin ((RS)-4-hydroxy-3-(3-oxo-1-phenylbutyl)-2H-chromen-2-one), chlorophacinone (2-[2-(4-chlorophenyl)-1-oxo-2-phenylethyl] indane-1,3-dione), diphacinone (2-(diphenylacetyl)-1H-indene-1,3 (2H)-dione), bromadiolone (3-[3-[4-(4-bromophenyl) phenyl]-3-hydroxy-1-phenylpropyl]-2-hydroxychromen-4-one), difethialone (3-[3-[4-(4-bromophenyl) phenyl]-1-tetralinyl]-2-hydroxy-4-thiochromenone), and brodifacoum (3-[3-[4-(4-bromophenyl) phenyl]-1,2,3,4-tetrahydronaphthalen-1-yl]-2-hydroxychromen-4-one).

11. The composition of claim 9, wherein the toxicant comprises one or more of bromethalin (N-methyl-2,4-dinitro-6-(trifluoromethyl)-N-(2',4',6'-tribromophenyl) aniline), cholecalciferol ((36,5Z,7E)-9,10-secocholesta-5,7, 10 (19)-trien-3-ol), zinc phosphide (zinc phosphide/trizinc diphosphide), and strychnine (strychnidin-10-one).

12. The composition of claim 1 is a granule, a powder, a solid block, a gel, a paste, a liquid, or a combination thereof.

13. The composition of claim 1, further comprising a food bait.

14. A device for attracting a mouse, the device comprising:
   a housing or a trap; and
   the composition of claim 1;
   wherein the composition is adjacent to, or included within, the housing or the trap.

* * * * *